United States Patent [19]

Thomas

[11] 4,163,187

[45] Jul. 31, 1979

[54] ALTERNATOR HAVING SINGLE STATOR WITH DUAL WINDINGS AND COMPOUND OUTPUT

[75] Inventor: Serge J. H. Thomas, Paris, France

[73] Assignee: Motorola Automobile, Angers, France

[21] Appl. No.: 645,493

[22] Filed: Dec. 31, 1975

[30] Foreign Application Priority Data

Jan. 9, 1975 [FR] France .................................. 75 00583

[51] Int. Cl.² .............................................. H02P 9/10
[52] U.S. Cl. ........................................ 322/29; 307/76; 322/90
[58] Field of Search ...................... 322/29, 90, 79, 18; 310/198; 307/84, 71, 76

[56] References Cited

U.S. PATENT DOCUMENTS

| | | | |
|---|---|---|---|
| 2,900,591 | 8/1959 | Jacob | 310/198 X |
| 3,160,772 | 12/1964 | Miron | 322/90 X |
| 3,621,368 | 11/1971 | Jules | 322/18 |
| 3,689,826 | 9/1972 | Cherry | 322/29 |
| 3,771,046 | 11/1973 | Harter | 322/90 X |
| 3,793,544 | 2/1974 | Baumgartner et al. | 310/198 X |

Primary Examiner—Robert J. Hickey
Attorney, Agent, or Firm—Margaret Marsh Parker; James W. Gillman

[57] ABSTRACT

A dual wound stator for a multiphase alternator operating at varying speeds and supplying rectified current at constant voltage with variable output. By combining windings having many turns of smaller wire with windings having fewer turns of larger wire, a compound curve of output is obtained, combing low cut-in speed with high maximum output and increased efficiency.

27 Claims, 8 Drawing Figures

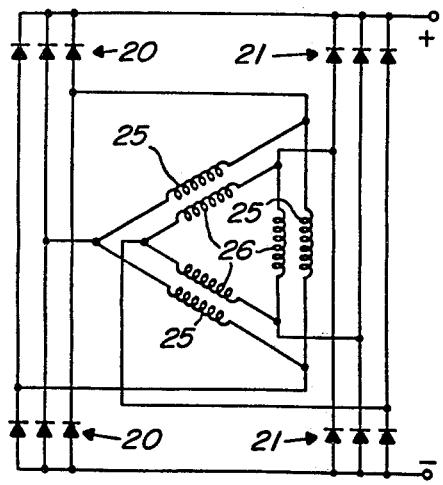
FIG.4
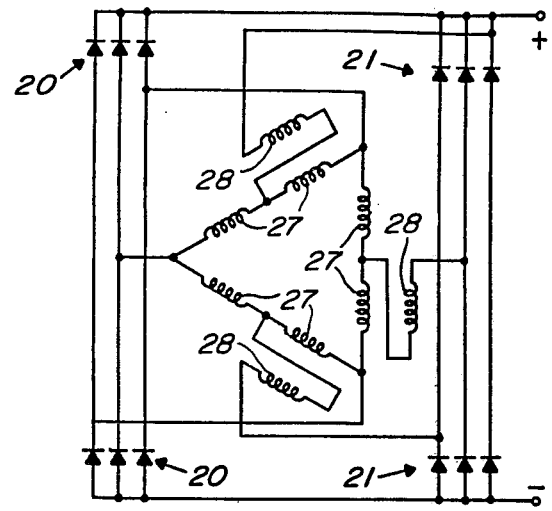
FIG.6
FIG.5
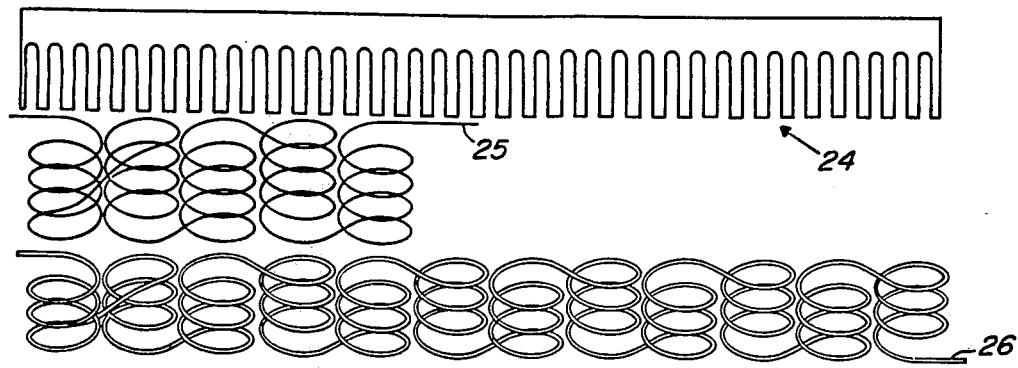
FIG.7
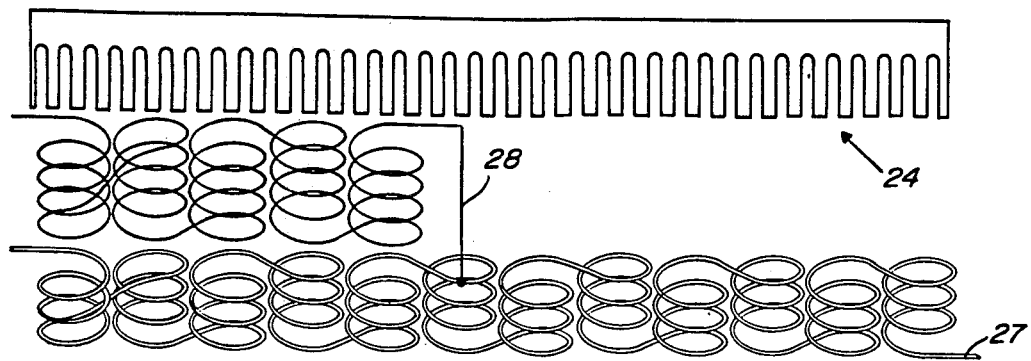

ALTERNATOR HAVING SINGLE STATOR WITH DUAL WINDINGS AND COMPOUND OUTPUT

BACKGROUND OF THE INVENTION

1. Field of the Invention

This invention relates to the field of multiphase alternators operating at varying speeds, and more particularly, to alternators required to have low cut-in speed combined with high current output at high speed.

2. Prior Art

Increasing power demands on automobile alternators are already pushing present day alternators toward their maximum output point and the trend for the future indicates an ever increasing power demand. A typical alternator in current use would have a cut-in speed of around 1000 rpm and supply a maximum of around 60 amperes at 8000 rpm. Increasing the size of wire used in the stator winding would increase the available current output, but because the space in the stator slots is limited if the overall size of the alternator is not changed, this would require a reduction in the number of turns in the winding, thus raising the cut-in speed. Since cut-in speed denotes that speed at which the alternator takes from the battery the function of supplying current and recharging of the battery can begin, merely increasing the wire diameter is not a desirable solution. Another approach to achieving the desired output characteristic is to use conventional windings but switch the interconnection thereof from a series to a parallel arrangement, but this method has an added complication in the sensing and switching mechanisms required. Another solution would be a larger alternator with appropriately higher cost, and since space in the engine compartment is already at a premium, this too, is not a desirable solution.

SUMMARY OF THE INVENTION

Therefore, it is a general object of the present invention to provide, in a multiphase alternator operating at varying speeds, an output combining low cut-in speed with high current capability.

It is yet another object of this invention to provide the desired output characteristics in an alternator system requiring only extra diode rectifiers as added components.

It is a particular object of the invention to provide such an alternator with no added weight or space requirement and having less internal heating.

It is another object of this invention to provide an alternator with greater maximum output combined with increased efficiency.

In accordance with the present invention an alternator is provided for supplying rectified current at varying speeds. The alternator includes a rotor, a stator with slots for receiving stator windings, a field winding and an output terminal, the stator being a single stator having dual windings. The first stator winding is received in the slots and has a first number of turns of wire of a first cross sectional area adapted to provide an additional predetermined current output at a first predetermined rotor velocity and to provide a nominal current output at rotor velocities higher than a second predetermined velocity. The second stator winding is received in the slots and has a smaller number of turns and larger cross sectional area of wire than the wire of the first winding and is adapted to provide at a third predetermined rotor velocity intermediate the first and second velocities and the initial current output equal to the initial predetermined current output of the first stator winding. The second winding is also adapted to provide a current output substantially greater than the current output of the first winding at rotor velocities higher than the second velocity. Means are provided for rectifying and adding the outputs to provide a compound output at the alternator output terminals. Preferably the windings are each three phase but may be multiple monophase windings.

BRIEF DESCRIPTION OF THE DRAWING

FIG. 4 is a second embodiment of the invention.

FIG. 5 is a plan of a possible winding of one phase of the embodiment shown in FIG. 4, again showing position of the coils only.

FIG. 6 is another embodiment of the invention.

FIG. 7 is a plan of a possible winding of one phase of the embodiment shown in FIG. 6, again showing position of the coils only.

DESCRIPTION OF THE PREFERRED EMBODIMENTS

Figure 1:
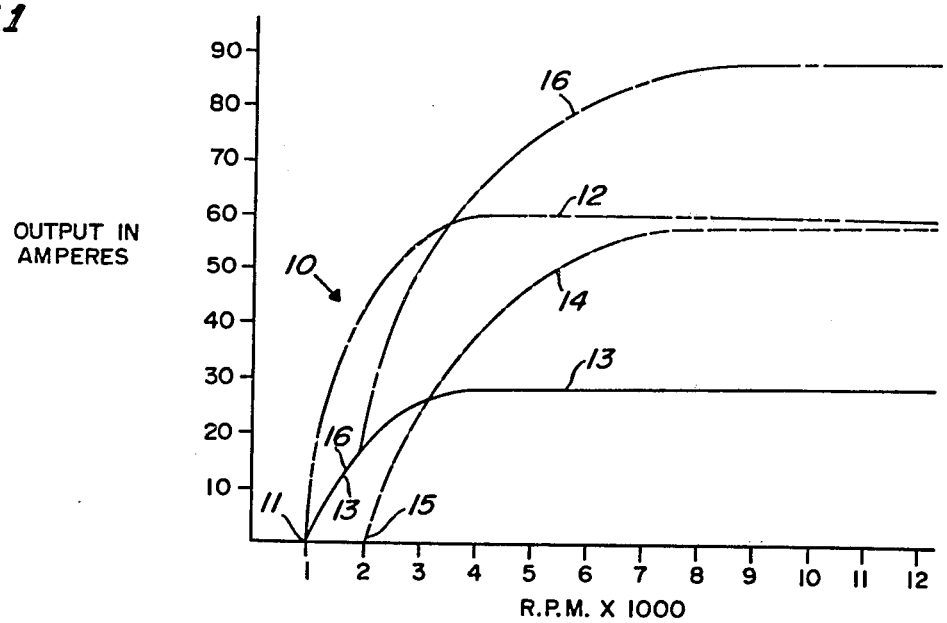
FIG. 1 is a graph of output in amperes vs. rpm.

Referring now to the drawing and in particular to FIG. 1, a typical curve 10, showing output (amperes) vs. rpm is given for a conventional alternator (not shown) of a type now being used. The cut-in speed 11 is somewhere above 1000 rpm and the output current levels off at a point 12 slightly above 60 amperes. The term "cut-in speed" refers to that engine velocity at which the output voltage of a given winding is equal to the applied battery voltage. Curve 13 is an output curve for one winding of the alternator shown in FIG. 2, according to the present invention, with its cut-in speed also at point 11. Curve 14 is an output curve for a second winding of the alternator in FIG. 2 with its cut-in speed at point 15. Curve 16 is the sum of curve of curves 13 and 14 and represents a typical output of an alternator made according to the present invention. These curves will be referred to and explained more fully below.

It should be noted here that where the term "delta connection" is used in this application, a "wye" or star connection could be used without altering the spirit or scope of the invention. Where one of the windings is wye-connected and one delta-connected, the two windings could have the same number of turns or the wye-connected winding could have somewhat fewer turns, although the wye-connected winding would preferably have the greater number of turns. Also, it is not intended that the invention be limited to three phase operation but would apply to any desired multiphase or multiple monophase design made according to the invention. In conventional alternator parlance it is understood that the term "rotor" refers to the rotating member of the alternator and is sometimes called the "field" since it usually carries the field winding on a rotatable shaft. The term "stator" refers to the stationary windings of the alternator and is sometimes referred to as the "armature". However, it is also known that alternators may be constructed in which the "field" is the stationary member and the "armature" is the rotating member. The present invention is broad enough in scope to cover all such constructions, including constructions where both armature and field are stationary and output current is generated in the armature by providing a rotatably mounted means intermediate the said two members for interrupting the flux therebetween.

Figure 2:
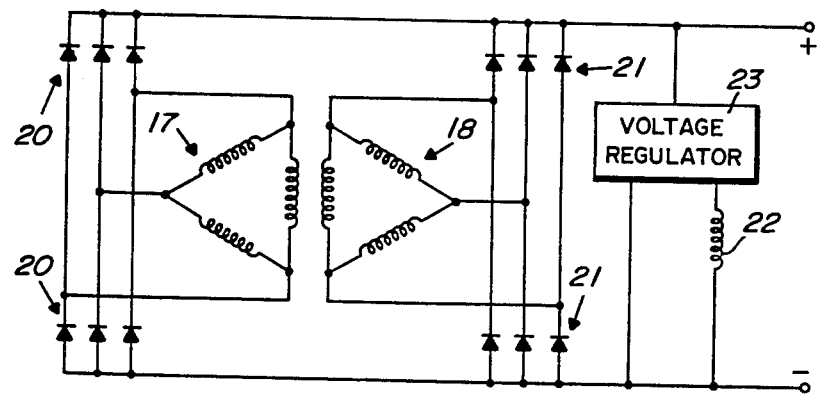
FIG. 2 is a schematic of a preferred embodiment of the invention.

FIG. 2 shows a delta or triangle-connected winding 17. The winding 17 has many more turns of smaller wire than has been used in alternators heretofore. However, only half the EMCs are used for this winding. By EMC applicant means "elementary magnetic circuit". An EMC is equal to one pole pitch. In the other half of the EMCs, another winding 18 is laid with half as many turns per EMC as winding 17, but of wire having twice the cross section. Typical numbers here might be 26 turns of wire with a 0.92 mm diameter in an EMC in winding 17 and 13 turns of wire with a 1.3 mm diameter in an EMC of winding 18. The distribution of the EMCs of each winding can be done in any way, sequential or alternated. Each winding 17 and 18 has its own full wave rectifier 20 and 21 respectively. The two rectifiers are connected in parallel and a field coil 22, supplied by a regulator 23 is connected across the combined output.

Figure 3:
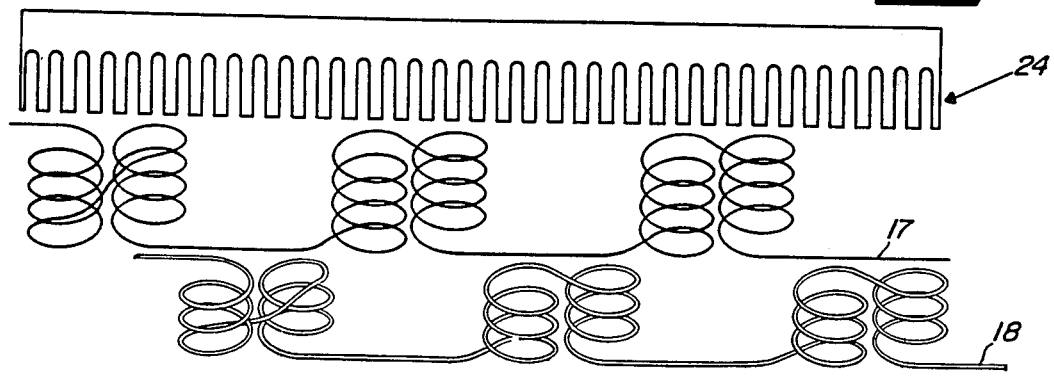
FIG. 3 is a plan of a possible winding of one phase of the embodiment of FIG. 2, showing the position of the coils and relative size of wire but not attempting to show the relative number of turns in each coil.

FIG. 3 shows a plan for one possible layout of the winding of one phase of FIG. 2. Here the stator 24 is shown with the winding 17 and the winding 18 for one phase in place. Windings for the other phases (not shown) would be similar, but of course, separated by 120° (electrical degrees).

Referring back to FIG. 1, curve 13 would derive from the winding 17. This winding supplies the low cut-in at around 1000 rpm, but its output levels off somewhere above 30 amperes. The winding 18 starts contributing to the alternator output at around 2000 rpm as shown in curve 14 of FIG. 1, but supplies about 60 amperes to the maximal output. Curve 16 of FIG. 1 is a composite of curves 13 and 14 and is the actual output of the present alternator. Curve 10 is the comparative output for an alternator using 13 turns of wire having a diameter of 1.3 mm in each of the 6 EMCs.

The volume and weight of the copper wire in the alternator of the present invention are the same as that used in the conventional alternator of curve 10, and the heating by joule effect is less for the present invention up to at least 8000 rpm. If the resistance of the three phases of the conventional alternator of curve 10 is designated as "R", the winding 17 of the invention would have a resistance of 2R since the number of turns is the same as in the conventional alternator but the wire has half the cross section. The winding 18 has only half as many turns as the conventional alternator and uses the same size wire, thus, its resistance has a value of 0.5R. At, for example 8000 rpm, the I²R loss for the conventional alternator (curve 10 of FIG. 1) would be $R \times 62^2 = 3844R$ and for one embodiment of the present invention (curves 13, 14 of FIG. 1)

$$(2R \times 31^2) + (0.5R \times 60^2) = 3722R.$$

At 10,000 rpm the losses caused by bearing friction, windage, hysteresis and joule effect are essentially the same in the conventional alternator and the present alternator. The maximal current output is increased by approximately half (from 62 to 90 amperes). The efficiency (I²R loss/power out) goes from 28% to approximately 41%.

FIG. 4 is a schematic diagram of another embodiment of the invention with two separate delta connections. Again the low cut-in winding 25 occupies only half of the EMCs, and the number of turns remains unchanged. However, in this case, a smaller size of wire is used for this winding. The high output winding 26 has only 9 turns per EMC but uses all 6 EMCs. Thus, in each phase, three sections of winding 26 overlay the three sections of winding 25, and the output is effected by the mutual inductance. The two deltas 25 and 26 are not directly connected and each has its own rectifier 20, 21. The field coil and its regulator are not shown here. FIG. 5 shows the plan for a possible layout of the winding of the embodiment in FIG. 4.

FIG. 6 shows yet another embodiment of the invention wherein the high output winding 27 uses a few turns of heavy wire in each EMC. The low cut-in winding 28 uses more turns of smaller wire in only half the EMCs. However, in this embodiment, not only is there mutual inductance between the turns of winding 28 and the turns of winding 27 which share slots with it, but winding 28 is tapped into the midpoint of each phase of winding 27. This puts each phase of winding 28 in series with one half of one phase of winding 27, thus providing still another output characteristic. The voltages of each phase of winding 28 add to those of the portions of the winding 27 respectively. The windings 27 and 28 may be connected to rectifiers 20 and 21 as shown in FIG. 6, but these connections can also be varied for desired diode loading. FIG. 7 shows a plan for a possible layout of one phase of the winding of FIG. 6.

Figure 8:
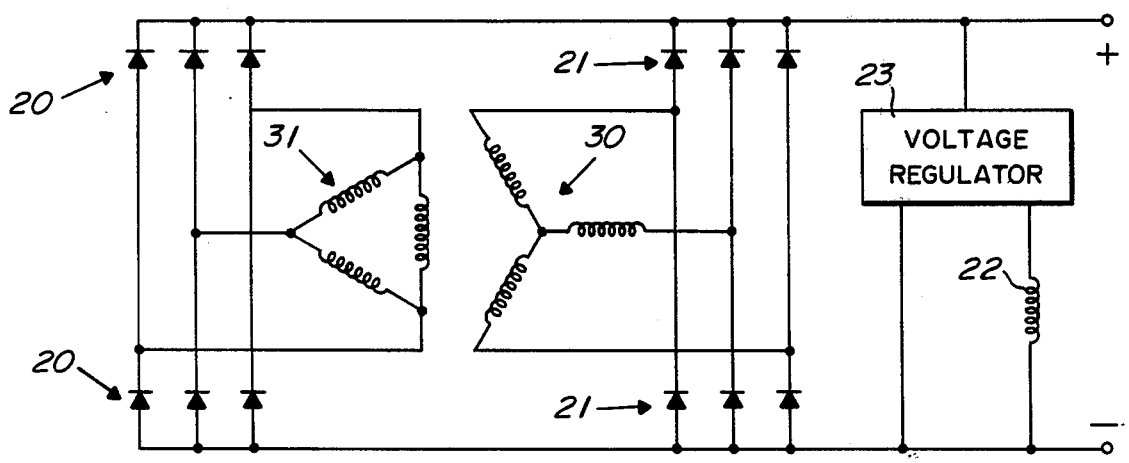
FIG. 8 is yet another embodiment of the invention.

FIG. 8 is another embodiment of the alternator of the invention, having an armature winding 30, connected in a wye configuration and another armature winding 31, connected in a delta configuration. It will be seen that, with the same number of turns on each of the windings 30 and 31, a compound output curve similar to curve 16 of FIG. 1 can be produced. This is because the wye-connected winding 30 can provide a lower cut-in speed than the delta-wound winding 31, and the winding 31 can provide a higher maximum current. Thus the combined output is a compound curve of output as in curve 16 of FIG. 1. If the delta-connected winding 31 was also wound of heavier wire than the wye-connected winding 30, and the winding 30 had more turns than the winding 31, the resulting output current would show the effect of an even lower cut-in speed and still higher maximum current.

To summarize the structure and operation of the present invention briefly, a stator is wound with one winding having many turns of small wire, providing low cut-in speed and a winding having fewer turns of larger wire, providing higher cut-in speed, but higher current output. Each winding is connected to a separate diode bridge for rectification and the outputs are connected in parallel for an additive or compound current output curve. This improved output has the advantages of low cut-in speed combined with higher maximal output current than the conventional alternator.

It is intended that the foregoing cover any and all aspects and adaptations of the present invention as are within the spirit and range of equivalence of the following claims:

What is claimed is:

1. In an alternator for supplying rectified current at varying speeds having a rotor, a field winding on the rotor, a stator, the stator having slots for receiving stator windings, and output terminal wherein the improvement comprises:

a single stator having
- at least one first stator winding received in the slots having a first number of turns of wire of a first cross sectional area adapted to provide a predetermined voltage output at a first predetermined rotor velocity and to provide a current output at rotor velocities higher than a second predetermined velocity,
- at least one second stator winding received in the slots having a second number of turns of wire of a second cross sectional area adapted to provide at a third predetermined rotor velocity a voltage output equal to the predetermined voltage output of the first stator winding, the second number of turns of wire being less than the first number of turns and the second cross sectional area being greater than the first cross sectional area,
- the third velocity being intermediate the first and second velocities,
- the second winding being adapted to provide a current output substantially greater than the current output of the first winding at rotor velocities higher than the second velocity,
- means for rectifying the outputs, and
- means for adding the rectified output currents whereby a compound curve output is provided at the alternator output terminals.

2. In an alternator as for an engine ignition system for supplying rectified current at constant voltage while operating at varying speeds, the system including an alternator having at least a rotor, a field winding on the rotor, and a stator, the stator being adapted to receive stator windings, the system comprising:
(a) at least one first stator winding adapted to provide a predetermined voltage output at a first predetermined rotor velocity, and adapted to provide a first current output at rotor velocities higher than the first predetermined velocity,
(b) at least one second stator winding having a voltage output lower than the predetermined voltage at the first predetermined rotor velocity, the second winding being adapted to reach the predetermined voltage at a second predetermined velocity, the second velocity being higher than the first predetermined velocity and the second winding being adapted to provide a current output greater than the output of the first winding at rotor velocities substantially higher than the second predetermined velocity,
(c) means for rectifying the outputs, and
(d) means for adding the rectified output currents to provide a continuous output current after the first predetermined rotor velocity is attained.

3. An alternator as for an engine ignition system for operating at varying speeds and comprising:
a support member,
a field,
an armature,
one of the field and armature being rotatably mounted to the support member and adapted to cooperate with the other to provide an output current in the armature upon rotating the rotatably mounted one of the field and armature,
the armature including,
at least one first winding adapted for providing a predetermined voltage output at a first relative velocity between the field and armature and for providing a first current output at relative velocities higher than the first relative velocity and
at least one second winding adapted to provide a voltage output equal to the predetermined voltage output at a second relative velocity higher than the first relative velocity and to provide a current output higher than the first current output at relative velocities substantially higher than the second relative velocity,
means for rectifying the output currents, and
means for adding the rectified output currents and providing a continuous output current after said first relative velocity is attained.

4. The alternator as claimed in claim 3, wherein at least one of the windings is a multiphase winding and is connected in a delta configuration.

5. The alternator as claimed in claim 3, wherein at least one of the windings is a multiphase winding and is connected in a wye-configuration.

6. The alternator as claimed in claim 3, wherein the first and second armature windings are each multiphase windings, the first windings being wye wound and the second windings being delta wound.

7. An alternator which is a monophase current generating device for operating at varying speeds and comprising:
a support member,
a field,
an armature,
one of the field and armature being rotatably mounted to the support member and adapted to cooperate with the other to provide an output current in the armature upon rotating the rotatably mounted one of the field and armature,
the armature including,
at least one of a first winding adapted for providing a predetermined voltage output at a first relative velocity between the field and armature and for providing a first current output at relative velocities higher than the first relative velocity and,
at least one of a second winding adapted to provide a voltage output equal to the predetermined voltage output at a second relative velocity higher than the first relative velocity and to provide a current output higher than the first current output at relative velocities higher than the second relative velocity,
means for rectifying the output currents, and
means for adding the rectified output currents.

8. The alternator as claimed in claim 3, wherein the alternator is a multiphase current generating device.

9. An alternator for operating at varying speeds and comprising:
a support member,
a field,
an armature,
one of the field and armature being rotatably mounted to the support member and adapted to cooperate with the other to provide an output current in the armature upon rotating the rotatably mounted one of the field and armature,
the armature including,
at least one of a first winding adapted for providing a predetermined voltage output at a first relative velocity between the field and armature and for providing a first current output at relative velocities higher than the first relative velocity and at least one of a second winding adapted to provide a voltage output equal to the predetermined voltage output at a second relative velocity higher than the first relative velocity and to provide a current output higher than the first current output at relative velocities higher than the second relative velocity, wherein the first winding is of higher number of turns per phase than the second winding and the second winding is of larger cross-sectional area than the first winding, means for rectifying the output currents, and means for adding the rectified output currents.

10. The alternator as claimed in claim 3, wherein the first armature winding is connected to at least one of the rectifier means and the second armature winding is connected to at least another one of the rectifier means, independently of the first armature winding.

11. The alternator as claimed in claim 3, wherein the armature has slots for receiving the armature windings and the first armature winding and the second armature winding are laid in separate slots in the armature.

12. The alternator as claimed in claim 11, wherein the slots in which the first winding is laid are alternate slots relative to the slots in which the second winding is laid.

13. The alternator as claimed in claim 3, wherein at least some of the turns of the second armature winding are in the same slots with the turns of the first armature winding for mutual inductance therewith.

14. An alternator for operating at varying speeds and comprising:
 a support member,
 a field,
 an armature,
 one of the field and armature being rotatably mounted to the support member and adapted to cooperate with the other to provide an output current in the armature upon rotating the rotatably mounted one of the field and armature,
 the armature including;
 at least one of a first winding adapted for providing a predetermined voltage output at a first relative velocity between the field and armature and for providing a first current output at relative velocities higher than the first relative velocity and
 at least one of a second winding adapted to provide a voltage output equal to the predetermined voltage output equal to the predetermined voltage output at a second relative velocity higher than the first relative velocity and to provide a current output higher than the first current output at relative velocities higher than the second relative velocity, and
 wherein the second armature winding comprises wire of larger cross-sectional area than does the first armature winding, at least some of the turns of the second armature winding are laid adjacent the turns of the first armature winding for mutual inductance therewith, the turns of each phase of the first winding are connected in a series circuit with a portion of the turns of the corresponding phase of the second winding, the series circuits being connected to a first and a second rectifier means, the remaining turns of each phase of the second winding being connected at a first end to the interconnection of the first winding and the said portion of the second winding and being connected at a second end to the second rectifier means; and further including
 means for adding the rectified output currents.

15. A multiphase alternator as for an engine ignition system for supplying rectified current at constant voltage while operating at varying velocities and having at least a rotor having a field winding thereon, and a stator adapted to receive stator windings, the alternator comprising:
 at least one first stator wye-connected winding adapted to provide a predetermined voltage output at a first predetermined rotor velocity, and adapted to provide a current output at rotor velocities higher than the first predetermined velocity,
 at least one second stator delta-connected winding having a voltage output lower than the predetermined voltage at the first predetermined rotor velocity, the second winding being adapted to reach the predetermined voltage at a second predetermined velocity, the second velocity being higher than the first predetermined velocity and the second winding being adapted to provide a current output greater than the output of the first winding at rotor velocities substantially higher than the second predetermined velocity,
 means for rectifying the outputs, and
 means for adding the rectified output currents to provide a continuous output current after the first predetermined rotor velocity is attained.

16. An alternator as for an engine ignition system for supplying rectified current at constant voltage while operating at varying velocities, the system including an alternator having at least a rotating shaft, a field structure, an armature, the armature being adapted to receive armature windings, and a field winding, one of said field structure and armature being mounted on the shaft, the system comprising:
 at least one first armature winding adapted to provide a predetermined voltage output at a first predetermined shaft velocity, and adapted to provide a current output at shaft velocities higher than the first predetermined velocity,
 at least one second armature winding having a voltage output lower than the predetermined voltage at the first predetermined shaft velocity, the second winding being adapted to reach the predetermined voltage at a second predetermined velocity, the second velocity being higher than the first predetermined velocity and the second winding being adapted to provide a current output greater than the output of the first winding at shaft velocities substantially higher than the second predetermined velocity,
 means for rectifying the output currents, and
 means for adding the output currents to provide a continuous output current after said first predetermined shaft velocity is attained.

17. The alternator of claim 1 wherein each winding is a three-phase winding.

18. The alternator as claimed in claim 17 wherein at least one of the windings is connected in a delta configuration.

19. The alternator as claimed in claim 17 wherein at least one of the windings is connected in a Y configuration.

20. An alternator for supplying rectified current at varying speeds having a rotor, a field winding on the rotor, a stator, the stator having slots for receiving stator windings, and output terminals wherein the improvement comprises:
 a single stator having
  at least one first stator winding received in the slots having a first number of turns of wire of a first cross-sectional area adapted to provide a predetermined voltage output at a first predetermined rotor velocity and to provide a current output at rotor velocities higher than a second predetermined velocity,
  at least one second stator winding received in the slots having a second number of turns of wire of a second cross sectional area adapted to provide at a third predetermined rotor velocity a voltage output equal to the predetermined voltage output of the first stator winding,
 the third velocity being intermediate the first and second velocities,
 the second winding being adapted to provide a current output substantially greater than the current output of the first winding at rotor velocities higher than the second velocity, and
 wherein the first stator winding comprises more turns per phase than does the second stator winding and wherein the second stator winding comprises wire of larger cross-sectional area than does the first stator winding,
 means for rectifying the outputs, and
 means for adding the rectified output currents whereby a compound curve output is provided at the alternator output terminals.

21. The alternator as claimed in claim 20 wherein the first stator winding is connected to at least one of the rectifier means and the second stator winding is connected to at least another one of the rectifier means, independently of the first stator winding.

22. The alternator as claimed in claim 21 wherein the first stator winding and the second stator winding are laid in separate slots in the stator.

23. The alternator as claimed in claim 22 wherein the slots in which the first winding is laid are alternate slots relative to the slots in which the second winding is laid.

24. The alternator as claimed in claim 21 wherein at least some of the turns of the second stator winding are in the same slots with the turns of the first stator winding for mutual inductance therewith.

25. An alternator for supplying rectified current at varying speeds having a rotor, a field winding on the rotor, a stator, the stator having slots for receiving stator windings, and output terminals where the improvement comprises:
 a single stator having
  at least one first stator winding received in the slots having a first number of turns of wire of a first cross-sectional area adapted to provide a predetermined voltage output at a first predetermined rotor velocity and to provide a current output at rotor velocities higher than a second predetermined velocity,
  at least one second stator winding received in the slots having a second number of turns of wire of a second cross-sectional area adapted to provide at a third predetermined rotor velocity a voltage output equal to the predetermined voltage output of the first stator winding,
 the third velocity being intermediate the first and second velocities,
 the second winding being adapted to provide a current output substantially greater than the current output of the first winding at rotor velocities higher than the second velocity, and
 wherein the second stator winding comprises wire of larger cross-sectional area than does the first stator winding, at least some of the turns of the second stator winding are laid adjacent the turns of the first stator winding for mutual inductance therewith, the turns of each phase of the first winding are connected in a series circuit with a portion of the turns of the corresponding phase of the second winding, the series circuits being connected to first and second rectifier means, the remaining turns of each phase of the second winding being connected at a first end to the interconnection of the first winding and the portion of the second winding and being connected at a second end to the second rectifier means;
 and means for adding the rectified output currents whereby a compound curve output is provided at the alternator output terminals.

26. An alternator which is a monophase current generating device for supplying rectified current at varying speeds having a rotor, a field winding on the rotor, a stator, the stator having slots for receiving stator windings, and output terminals wherein the improvement comprises:
 a single stator having
  at least one first stator winding received in the slots having a first number of turns of wire of a first cross-sectional area adapted to provide a predetermined voltage output at a first predetermined rotor velocity and to provide a current output at rotor velocities higher than a second predetermined velocity,
  at least one second stator winding received in the slots having a second number of turns of wire of a second cross-sectional area adapted to provide at a third predetermined rotor velocity a voltage output equal to the predetermined voltage output of the first stator winding,
 the third velocity being intermediate the first and second velocities,
 the second winding being adapted to provide a current output substantially greater than the current output of the first winding at rotor velocities higher than the second velocity,
 means for rectifying the outputs, and
 means for adding the rectified output currents whereby a compound curve output is provided at the alternator output terminals.

27. A multiphase alternator for supplying rectified current at constant voltage while operating at varying velocities and having at least a rotor having a field winding thereon, and a stator adapted to receive stator windings, the alternator comprising:
 at least one first stator wye-connected winding adapted to provide a predetermined voltage output at a first predetermined rotor velocity, and adapted to provide a current output at rotor velocities higher than the first predetermined velocity,
 at least one second stator delta-connected winding having a voltage output lower than the predetermined voltage at the first predetermined rotor velocity, the second winding being adapted to reach the predetermined voltage at a second predetermined velocity, the second velocity being higher than the first predetermined velocity and the second winding being adapted to provide a current output greater than the output of the first winding at rotor velocities substantially higher than the second predetermined velocity, wherein the first winding is of higher number of turns per phase than the second winding and the second winding is of larger cross-sectional area than the first winding, means for rectifying the outputs, and means for adding the rectified output currents.

* * * * *